United States Patent
Mohamed et al.

(10) Patent No.: US 12,156,531 B1
(45) Date of Patent: Dec. 3, 2024

(54) GRAIN-BASED INFANT CEREAL AND METHOD OF MAKING SAME

(71) Applicant: KING SAUD UNIVERSITY, Riyadh (SA)

(72) Inventors: Abdellatif Abdelhakim Mohamed, Riyadh (SA); Mohamed Abdrabo Ibraheem, Riyadh (SA); Mohamed Saleh Alamri, Riyadh (SA); Shahzad Hussain Fazal Dad, Riyadh (SA); Akram Ahmed Qasem, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/203,708

(22) Filed: May 31, 2023

(51) Int. Cl.
| | |
|---|---|
| *A21D 10/00* | (2006.01) |
| *A23L 3/48* | (2006.01) |
| *A23L 5/00* | (2016.01) |
| *A23L 7/10* | (2016.01) |
| *A23L 29/212* | (2016.01) |

(52) U.S. Cl.
CPC ............... *A23L 7/198* (2016.08); *A23L 3/48* (2013.01); *A23L 5/55* (2016.08); *A23L 29/212* (2016.08)

(58) Field of Classification Search
CPC .......... A23L 7/198; A23L 5/55; A23L 29/212; A23L 3/48
USPC ........................................................ 426/578
See application file for complete search history.

(56) References Cited

U.S. PATENT DOCUMENTS 4,485,120 A * 11/1984 Gantwerker ............. A23L 7/10
426/620
2015/0173401 A1 6/2015 Neaud et al.

FOREIGN PATENT DOCUMENTS

| CN | 103564344 A | 2/2014 |
|---|---|---|
| CN | 105028631 A | 11/2015 |
| CN | 105360914 A | 3/2016 |
| CN | 106261520 A | 1/2017 |
| CN | 109090455 A | 12/2018 |

OTHER PUBLICATIONS

Ahmed et al., "Effect of oven roasting treatment on the antioxidant activity, phenolic compounds, fatty acids, minerals, and protein profile of Samh (Mesembryanthemum forsskalei Hochst) seeds," LWT, vol. 131, Sep. 2020.

* cited by examiner

*Primary Examiner* — Brent T O'Hern
(74) *Attorney, Agent, or Firm* — Nath, Goldberg & Meyer; Joshua B. Goldberg

(57) ABSTRACT

Infant cereals play a significant role in the complementary baby feeding period. Provided is a preparation method for infant cereal, with a special focus on whole grain infant cereals as well as gluten free cereals. There is mounting evidence of many benefits of whole grain consumption for human health. Similarly, consumers often link the term whole grains to healthiness, which becomes a more important factor when selecting an infant cereal brand. Whole grain cereals ought to be presented as early as possible during infancy. Nonetheless, the greatest challenge that food manufacturers are facing is to drive consumers' acceptance, including taste. The complementary infant feeding is unquestionably key in shaping food preferences of infants. Therefore, it is a suitable period in life at which to introduce whole grain cereals for acceptance across the entire lifetime.

13 Claims, 1 Drawing Sheet

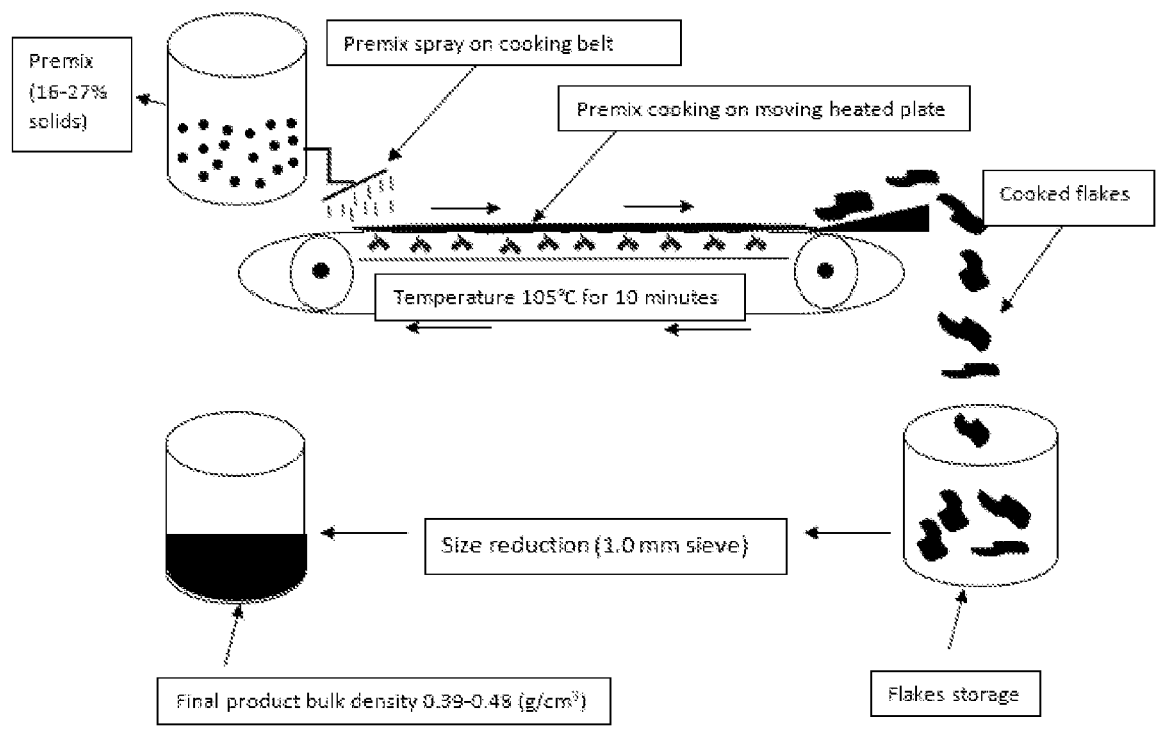

GRAIN-BASED INFANT CEREAL AND METHOD OF MAKING SAME

BACKGROUND

Field

The present subject matter relates to grain-based food products, and in particular to a grain-based infant cereal and method of making the same.

Description of the Related Art

Instant infant cereal flakes, which are marketed as dry cereal and which are readily rehydrated upon the addition of water or milk to produce a cereal meal with a cooked cereal texture, have become increasingly prevalent with many consumers. Instant cereals are preferred because they make it easy to prepare a meal by merely adding water or milk thereto.

U.S. Pat. No. 4,485,120 issued to Gantwerker et al. discloses the production of an instant infant cereal product with a reduced-viscosity, gelatinized, cereal flour-water mixture using mechanical shearing after cooking. This processing method added an extra "shear" step.

Heretofore, gelatinized enzyme treatment has been a preferred method for reducing the viscosity of cooked cereal mixtures. However, treatment with the enzyme reduces the viscosity by breaking down the starch molecules, thereby decreasing the average molecular weight and resulting in sufficiently high glucose levels upon drying. Accordingly, the dried product has an off-color due to browning reactions between the cereal proteins and the glucose, and also high flake densities.

The addition of millet flour to infant cereal is beneficial since millet has a high protein content (about 11-12.5%) as compared to other common grains. Therefore, the protein content of the infant cereal can be boosted by the addition of millet. For example, the protein content of a cereal product can be raised about 4-6% higher than the traditional cereals currently available in the market by the addition of millet.

Thus, a grain-based infant cereal and a method of making the same solving the aforementioned problems are desired.

SUMMARY

The present subject matter relates to a process for producing an instant baby cereal product from a mixture of cereal flour or whole meal and water by moving plate (flatbed) drying. The process results in a dry, gelatinized, instant cereal product.

In one embodiment, the present subject matter relates to the development of a formulation and processing method for producing infant cereal using local unconventional ingredients. This is inspired by the need for a local producer of infant cereals so as to provide a second source for the product, since all similar products in the local market are imported.

In another embodiment, the present subject matter relates to a production process of a dehydrated, readily hydrated dry infant cereal product by a moving heated plate (heated bed) drying method from a flurry of cereals flour and water mixture having a low final viscosity, without the addition of chemicals, enzymes, or shearing. In a further embodiment, the present subject matter provides a high protein, instant cereal which contains 13-14% protein. In certain embodiments, the present process for preparing the dry, gelatinized, instant cereal product can include I. preparing a slurry of cereal flour in water, in which the flour has a particle size of about 250 mm and wherein the flour has a solid content of 17-27% by weight based on the slurry weight; II. gelatinizing the slurry of flour (or flour blend) and water by heating on the moving plate at an average temperature range of about 105° C. to about 221° C.; and III. simultaneously cooking and drying the cereal flour-water mixture by the moving hot plate to yield dehydrated cereal material flakes having a moisture of less than 8% on a dry basis. In certain embodiments, the RVA (Rapid Visco Analyzer) viscosity of the gelatinized mixture can be greater than 20,000 cps at 160 rpm. In further embodiments, the dry flakes can be pulverized to produce a dry, gelatinized cereal product with a particle size of less than 250 mm, which pulverized, dry flakes can be instantly prepared as a hot or cold cereal as desired.

According to a further embodiment, the present subject matter relates to the use of locally produced grains such as millet, sorghum, samh, and corn, for producing infant cereal for the benefit of the local farmer and securing the local need as well. The present processes for producing infant cereal involve the use of flour or a whole meal of different grains. The raw materials in the form of a slurry are cooked on a moving hot flat plate (flatbed) or a drum drier type of cooker. The thus-produced cereal flakes can be readily rehydrated upon the addition of water or milk and can yield a texture of a cooked product.

In an embodiment, the present subject matter is therefore directed to a process for preparing a dry, gelatinized cereal product capable of instant rehydration, the process comprising: preparing a slurry comprising a component selected from the group consisting of a flour, a starch, and any combination thereof, and water having a solid content of about 16% to about 27% by weight; heating the slurry to a temperature of about 85° C. to about 110° C. until all flour/starch has completely gelatinized, thereby providing a gelatinized slurry; spraying the gelatinized slurry on a hot conveyer; cooking and drying the gelatinized slurry in a single step on the hot conveyer to obtain flakes; removing the flakes from the hot conveyer to obtain collected flakes; and milling the collected flakes to obtain the dry, gelatinized cereal product having a particle size of 250 mm or less and a bulk density of about 0.39 to about 0.48 g/cm³.

In another embodiment, the present subject matter relates to a dry, gelatinized cereal product prepared according to the processes as described herein.

These and other features of the present subject matter will become readily apparent upon further review of the following specification.

BRIEF DESCRIPTION OF THE DRAWINGS

FIG. 1 is a flow diagram showing the present process for making a dry, gelatinized cereal product.

DETAILED DESCRIPTION OF THE PREFERRED EMBODIMENTS

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In one embodiment, the present subject matter relates to the development of a formulation and processing method for producing infant cereal using local unconventional ingredients. This is inspired by the need for a local producer of infant cereals so as to provide a second source for the product, since all similar products in the local market are imported. The present subject matter for the first time identifies a one-step continuous process for preparing such dry, gelatinized cereal products capable of instant rehydration as a hot or cold cereal infant meal.

In an embodiment, the present subject matter is therefore directed to a process for preparing a dry, gelatinized cereal product capable of instant rehydration, the process comprising: preparing a slurry comprising a component selected from the group consisting of a flour, a starch, and any combination thereof, and water having a solid content of about 16% to about 27% by weight; heating the slurry to a temperature of about 85° C. to about 110° C. until all flour/starch has completely gelatinized, thereby providing a gelatinized slurry; spraying the gelatinized slurry on a hot conveyer; cooking and drying the gelatinized slurry in a single step on the hot conveyer to obtain flakes; removing the flakes from the hot conveyer to obtain collected flakes; and milling the collected flakes to obtain the dry, gelatinized cereal product having a particle size of 250 mm or less and a bulk density of about 0.39 to about 0.48 g/cm$^3$.

In an embodiment, the slurry can be prepared by mixing the ingredients in, for example, a blender. In this regard, the mixing can occur at about 500 rpm to about 700 rpm, or about 600 rpm, and can be conducted for at least about 5 minutes.

In one embodiment of the present processes, the speed of the conveyer can be adjusted to allow sufficient time for the gelatinized slurry to cook and dry. In another embodiment of the present processes, the flakes can be removed from the hot conveyer using a scraper. In one more embodiment, the milling can be conducted by a size reduction mill.

In certain embodiments, the slurry used in the present processes can further comprise sugar, salt, and flavoring. Similarly, prior to heating the slurry, a mixture of dextrose, caramel, coconut oil, sunflower oil, full fat milk powder, and water can be added to the slurry. In certain embodiments in this regard, the slurry can have an initial viscosity of less than about 40 cPs while, after the heating, the gelatinized slurry can have a viscosity of about 200 cPs, for example, a viscosity of about 200 cPs as measured by a rapid visco analyzer (RVA) at 160 rpm. In this regard, when the slurry is heated to between about 65° C. and about 85° C., the viscosity can increase to about 210 to about 280 cPs at the peak as measured by RVA, and can then decrease after breakdown of the starch, thereby reaching a viscosity of about 350 cPs after about 14 min.

In further embodiments, the hot conveyer can have a temperature of about 105° C. and the slurry can be cooked and dried on the hot conveyer for about 10 minutes to obtain the flakes having a thickness of about 2.5 to about 7.6 mm. In this regard, the slurry can start losing moisture as it moves on to the heated conveyer and forming the flakes after cooking and drying on the hot conveyer for about 3 minutes. The gelatinization can be completed while the slurry moves along the hot conveyer and the flakes are formed. Further, once formed, the collected flakes can have a moisture content of about 8% to about 9%, by weight. These collected, dehydrated flakes can be pulverized, thereby forming the dry infant cereal product having a bulk density of about 0.39 to about 0.48 g/cm$^3$, as compared a conventional infant cereal product having a bulk density of about 0.40 g/cm$^3$.

In another embodiment, the present processes can further comprise rehydrating the dry, gelatinized cereal product by adding hot or cold water or milk to obtain a reconstituted cereal product immediately prior to use. In certain embodiments in this regard, the dry, gelatinized cereal product can have an increased water holding capacity.

Regarding the flour used in the present processes, the flour can be one or more flours and/or starches. In this regard, by way of non-limiting example, the flour/starch can be selected from the group consisting of wheat flour, sorghum flour, millet flour, samh flour, corn starch, potato starch, and any combination thereof.

As described herein, a slurry of cereal flour, flour starch blend, or just starch in water can heated until complete gelatinization of the starch (in the flour as well) has been accomplished.

FIG. 1 is a flow diagram showing one specific process as described herein, which illustrates the continuous one step cooking-drying of the slurry through the sprayer and onto the hot plate (hot conveyer). The speed of the conveyer can be adjusted to allow for the slurry to cook and dry. At the end of the conveyer is a scraper used to remove and collect the flakes. The final product (flakes) can be passed through a size reduction mill, providing therefrom a 250 mm particle size product ready for packaging.

Referring to FIG. 1, the premixed slurry, having about 16 to about 27% by weight of solids, is first made and then sprayed on the cooking belt. The premix then simultaneously moves and cooks on the cooking belt/heated plate, which can be maintained at an elevated temperature, for example, a temperature of about 105° C., for about 10 minutes. The cooked flakes are then scraped off the conveyer and collected in a storage container. The collected flakes then have their size reduced, for example, by pulverization, until a final product is formed having a bulk density of about 0.39 to about 0.48 g/cm$^3$.

In another embodiment, the present subject matter relates to a dry, gelatinized cereal product prepared according to the processes as described herein. In this regard, in the dry, gelatinized cereal product, the flour/starch can be selected from the group consisting of wheat flour, sorghum flour, millet flour, samh flour, corn starch, potato starch, and any combination thereof.

In one embodiment, the flour/starch comprises samh flour, either alone or in addition to any of the other flours/starches mentioned. The flakes prepared by the present processes can have a density in the range 0.39 to 0.48 g/ml. Therefore, the dried cereal flakes may be rehydrated by addition of hot or cold water or milk. The reconstituted product can have a viscosity typical of conventionally processed cereal flakes, i.e., 500-1300 cPs as measured by RVA at 160 rpm. In an embodiments, once the flakes are rehydrated, the viscosity of the rehydrated product can be <800 cPs. One would expect to see limited variation between flakes thickness and viscosity after rehydration regardless of the base flour composition of the initial slurry used. For example, regardless of whether the slurry comprises a base flour such as wheat, millet, or sorghum, or only comprises a starch or grain flour and starch blends with the remaining ingredients, the resultant thickness and viscosity after rehydration is not expected to vary considerably.

EXAMPLES

All materials used in the present examples were obtained from local markets in Riyadh, Saudi Arabia. The following grains were locally grown: wheat flour, sorghum flour, millet flour, corn starch, and potato starch. The following ingredients were purchased from a local market: sugar, full fat milk powder, dextrose, salt, flavor, caramel, coconut oil, and sunflower oil. Wheat flour, sorghum flour, millet flour, corn starch, and potato starch were milled and sieved through a 250 mm sieve. Based on the flour weight, 20% sugar, 30% full fat milk powder, 4% dextrose, 0.4% salt, 0.8% flavor, 12% caramel, 2% coconut oil, and 2% sunflower oil were potentially used.

Example 1

A number of formulations were prepared as follows by using one type of the following base flours: wheat flour, sorghum flour, samh flour, or millet flour; and/or one type of starch: corn starch or potato starch. Different blends from wheat flour and corn or potato starch were prepared by adding 5% or 10% starch of the flour weight. Another blend was prepared by replacing 5% or 10% of the flour weight with starch.
 1. 100% wheat flour
 2. 100% millet flour
 3. 100% sorghum flour
 4. Wheat flour partially replaced with 5% or 10% corn starch
 5. Wheat flour partially replaced with 5% or 10% potato starch
 6. Corn starch was added to wheat flour at 5%
 7. Corn starch was added to wheat flour at 10%
 8. Potato starch was added to wheat flour at 5%
 9. Potato starch was added to wheat flour at 5%

Slurry Preparation:

A slurry of a flour-water mixture was prepared having a solid content range between 16% to 27% by weight. The total amount of water added was 600 ml, where 550 ml of water was added to the dry ingredients and 50 ml of water was added to the remaining ingredients. This relationship between the ingredients and the water in this formulation was multiplied to prepare the needed batch.

Dry ingredients: to the dry flours, sugar, salt, and flavoring 550 ml water was added and hand blended. Other ingredients basis: to the following ingredients, dextrose, caramel, coconut oil, and sunflower oil 50 ml water was added. The 550 ml slurry was transferred to a kitchen aid blender where the rest of the 50 ml was added and mixed at 600 rpm for 5 min.

The initial viscosity of the slurry is less than 40 cPs but when heated between 65 and 85° C. the viscosity increased to about 210-280 cPs at the peak as measured by RVA and decreased after breakdown of the starch and reached a final viscosity of 350 cPs after 14 min. The scope of cooking-drying of the slurry in a one step process was to remove water from the cereal flour water mixture without substantially affecting the color, bulk density or rehydration properties of the final dry cereal product.

The viscosity of a sample collected from the conveyer 3 min after spraying was measured using RVA. The viscosity of the slurry increased from 30 cPs (before spraying) to 200 cPs (3 min after spraying). After 3 minutes, flakes start forming and the viscosity decreased thereby due to water evaporation. The thickness of the final flakes was 2.5 to 7.6 mm.

Additional details of the different products prepared can be seen by referring to the following Table 1.

TABLE 1

| Sample | Bulk density (g/cm$^3$) | Water holding capacity |
|---|---|---|
| Plain Wheat Flour | 0.39 | 3.3 |
| Plain Sorghum Flour | 0.46 | 4.9 |
| Plain Millet flour | 0.48 | 5.0 |
| Plain Corn starch | 0.41 | 3.5 |
| Plain Potato starch | 0.41 | 3.7 |
| 5% corn starch add | 0.43 | 3.2 |
| 10% corn starch add | 0.41 | 4.1 |
| 5% corn starch replaced | 0.40 | 3.3 |
| 10% corn starch replaced | 0.44 | 4.3 |
| 5% potato starch add | 0.43 | 4.9 |
| 10% potato starch add | 0.41 | 4.9 |
| 5% potato starch replaced | 0.40 | 3.3 |
| 10% potato starch replaced | 0.39 | 2.2 |
| Conventional product | 0.40 | 1.8 |

It is to be understood that the handpiece is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A process for preparing a dry, gelatinized cereal product capable of instant rehydration, the process comprising:
    preparing a slurry comprising a component selected from a group consisting of a flour, a starch, and any combination thereof, and water with the slurry having a solid content of about 16% to about 27% by weight;
    heating the slurry to a temperature of about 85° C. to about 110° C. until all of the flour/starch has completely gelatinized, thereby providing a gelatinized slurry;
    spraying the gelatinized slurry on a heated conveyer;
    cooking and drying the gelatinized slurry in a single step on the heated conveyer to obtain flakes;
    removing the flakes from the heated conveyer to obtain collected flakes; and
    milling the collected flakes to obtain the dry, gelatinized cereal product having a particle size of 250 mm or a particle size of less than 250 mm and a bulk density of about 0.39 to about 0.48 g/cm$^3$, and
    wherein the slurry has a first viscosity of less than about 40 cPs.

2. The process of claim 1, wherein a speed of the heated conveyer is adjusted based upon the temperature of the heated slurry to allow sufficient time for the gelatinized slurry to cook and dry.

3. The process of claim 1, wherein the flakes are removed from the heated conveyer using a scraper.

4. The process of claim 1, wherein the milling is conducted by a size reduction mill.

5. The process of claim 1, wherein the slurry further comprises sugar, salt, and flavoring.

6. The process of claim 1, wherein prior to the heating the slurry, a mixture of dextrose, caramel, coconut oil, sunflower oil, full fat milk powder, and water is added to the slurry.

7. The process of claim 1, wherein, after the heating, the gelatinized slurry has a second viscosity of about 200 cPs.

8. The process of claim 1, wherein the hot conveyor has a temperature of about 105° C. and the slurry is cooked and dried on the heated conveyer for about 10 minutes to obtain the flakes having a thickness of about 2.5 to about 7.6 mm.

9. The process of claim 1, wherein the slurry starts forming the flakes after the cooking and the drying on the heated conveyer for about 3 minutes.

10. The process of claim 1, further comprising rehydrating the dry, gelatinized cereal product by adding heated or cooled water or milk to obtain a reconstituted cereal product immediately prior to use.

11. The process of claim 10, wherein the reconstituted cereal product has a viscosity of about 500 to about 1300 cPs.

12. The process of claim 1, wherein the flour is selected from the group consisting of wheat flour, sorghum flour, millet flour, samh flour, and any combination thereof and wherein the starch is selected from the group of corn starch, potato starch, and any combination thereof.

13. The process of claim 1, wherein the collected flakes have a moisture content of about 8% to about 9% by weight.

* * * * *